Aug. 26, 1958 L. J. FROST 2,849,305
ELECTRIC FURNACE PRODUCT
Filed Aug. 30, 1954

Inventor
Leon J. Frost

United States Patent Office 2,849,305
Patented Aug. 26, 1958

2,849,305

ELECTRIC FURNACE PRODUCT

Leon J. Frost, Lewiston, N. Y., assignor to National Lead Company, New York, N. Y., a corporation of New Jersey Application August 30, 1954, Serial No. 453,109

5 Claims. (Cl. 51—307)

This invention relates to electric furnace products and is particularly concerned with products of this character which are hard and are adapted for use as abrasives.

It is an object of the invention to provide a novel and useful abrasive product.

Another object of the invention is to provide a product of the character described which comprises a crystalline matrix of a tough, hard material having dispersed therein fine crystals of an even harder material.

A further object of the invention is to provide a product of the character described which is of value in the rapid cutting or abrasion of hard materials such as tool steel.

More specifically, it is an object of the invention to provide an abrasive product which comprises a matrix of alpha alumina crystals which have dispersed therein fine crystals of titanium carbide.

In the form generally known and referred to as "fused alumina" or "fused aluminum oxide" alpha alumina has been extensively used as an abrasive product for many years. Such use has resulted from the properties of the alpha alumina which is relatively tough while at the same time quite hard (9 on Mohs' scale). On the other hand, titanium carbide, while harder than alpha alumina, has not been previously used as an abrasive to any considerable extent because of its extreme brittleness or friability.

It has now been discovered that a product may be obtained which consists essentially of fine crystals of titanium carbide dispersed throughout a matrix of crystalline alpha alumina. Particles or granules of this product have been found useful as an abrasive since the alpha alumina thereof makes them tough and hard while the titanium carbide crystals embedded therein, which are of greater hardness, give a rapid cutting action on certain materials. There is thus provided an abrasive material, from which fast cutting abrasive wheels having good efficiency ratios may be manufactured. This novel product may be obtained by fusing together alumina and titanium oxide in the presence of a reducing agent, such as coke.

Figure 1:
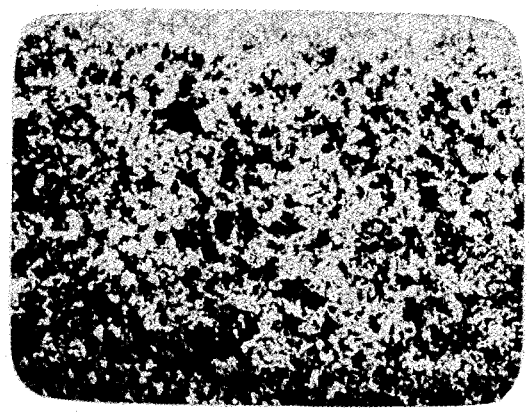
Figure 2:
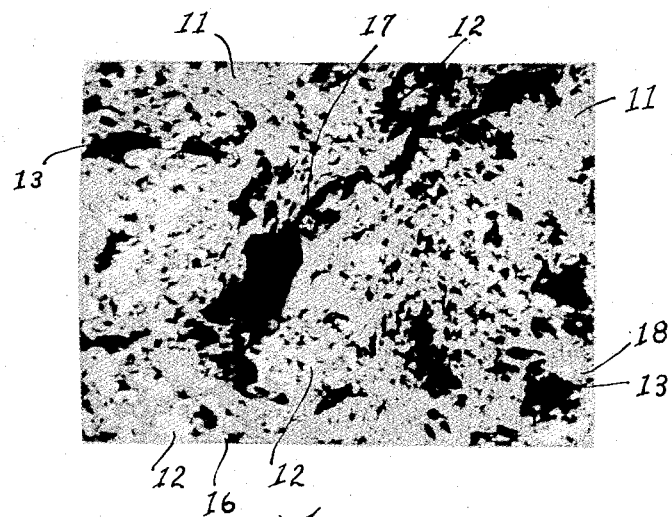

The structure of a novel product according to the present invention is shown in the accompanying drawings in which:

Figure 1 is a reproduction of a photomicrograph of a polished section of a specimen of a novel abrasive product according to the invention, the enlargement being about 30 diameters; and Figure 2 is a reproduction of a similar photomicrograph of the same specimen but at an enlargement of 200 diameters.

In Figure 2 of the drawings, the reference numeral 11 is used to indicate the crystalline alpha alumina matrix. Certain of the minute crystals of titanium carbide dispersed in the matrix and appearing as light areas against the grey background of the alumina matrix are designated by the reference numerals 12. The dark areas, certain of which are designated by the numerals 13 and which are particularly noticeable in Figure 2 because of the higher magnification, are pores in the specimen.

The small size of the titanium carbide crystals in the specimen may be more readily comprehended from Figure 2. The actual diameters of the particles in this figure designated by the numerals 16, 17 and 18 are, respectively, about 20.0, 10.0, and 7.5 microns.

The products are dark in color, probably as a result of the use of excess carbon for the reason explained below, and have a conchoidal fracture. Depending upon the method of crushing employed, the individual abrasive granules may tend to be chunky or rounded or to be rather splintery. As would be expected, the specific gravity of the products is greater than that of alumina, ranging between about 4.05 and about 4.9 depending upon the composition.

The following example illustrates one method of producing a novel abrasive material according to the present invention.

EXAMPLE 1

100 parts by weight of calcined aluminum hydroxide, 10 parts by weight of milled rutile, and 5 parts by weight of petroleum coke, all in granular or finely divided form, were milled together to obtain an intimate mixture. After drying the mixture, a portion thereof was charged into a heated graphite crucible. This crucible constituted one electrode of an electric arc furnace, the other electrode being provided by a graphite rod suspended within the crucible and spaced therefrom. The voltage used was in the range of from 25–30 volts and the current drawn varied between about 800 and 1000 amperes. Additional portions of the milled mixture were charged into the crucible at intervals. When charging was completed and the whole mass in the crucible had been brought into a fused condition the furnace was shut off, the mass being allowed to cool in the crucible. The temperature of the fused mass before cooling was about 4100° F. or above. When cool, the resulting pig was removed from the crucible and crushed to obtain granules usable as abrasive granules or grit. X-ray diffraction examination of the product showed the composition thereof to be approximately 90% alpha alumina and 10% titanium carbide. Using a 100 gram load on a Wilson Tucon hardness tester a Vickers hardness averaging 3000 for the TiC phase was obtained. With the same instrtument and load the $Al_2O_3$ phase showed an average hardness of 1525.

In producing novel products according to the present invention it is not necessary for the alumina and titania to be charged into the furnace as pure materials. As indicated above, certain ores of titanium and aluminum may be satisfactorily used. For example, as mentioned, the titania desired may be supplied by rutile. Other titanium ores such as brookite, arizonite or ilmenite may also be employed. Similarly, the desired alumina may be supplied by such ores as bauxite, corundum, or gibbsite. When ores are used as raw materials preliminary refinement or other suitable, additional treatment following known procedures may be desirable to remove all or a portion of the oxides or other substances associated with the titania or alumina. Prefused mixtures of alumina and titania may also be used. In such prefused mixtures, which may be produced as metallurgical slags, the titania is sometimes already partially reduced. This, however, is unimportant since to form TiC it must be reduced anyhow. In the following examples a granulated, prefused mixture of this type was employed as a starting material for making a hard fused abrasive product according to the present invention. By analysis, exclusive of impurities the prefused material contained about 74% $Al_2O_3$ and 26%, expressed as titania, of titanium oxides and other compounds.

EXAMPLE 2

100 parts by weight of the prefused mixture described above and 12.5 parts by weight of granular petroleum coke were milled until the materials were intimately mixed and finer than 60 mesh. The mixture after drying was charged gradually into an arc furnace of the type described in Example 1 and fused in substantially the same way. The pig obtained from the graphite crucible after cooling was crushed to obtain abrasive grit. The product had a composition, as shown by X-ray diffraction, of approximately 75% alpha $Al_2O_3$ and 25% TiC. The TiC phase had an average Vickers hardness of 3000, and the alumina phase an average Vickers hardness of 1550.

The following examples illustrate the production of products formed by fusing together the prefused mixture employed in Example 2 with additional rutile or alumina in varying proportions and a suitable proportion of petroleum coke. In each example the fusion was made in an arc furnace of the type described in Example 1 and periodic additions of charge were made to the furnace until a melt of the desired size was obtained. The compositions of the products were determined by X-ray diffraction.

EXAMPLE 3

100 parts of the prefused alumina-titania product referred to above were mixed with 25 parts by weight of calcined alumina and 12.5 parts by weight of petroleum coke. These materials were milled together to obtain an intimate mixture and then fused. The resulting pig was crushed to obtain abrasive grain. The composition of the fused product was found to be approximately 80% $\alpha\ Al_2O_3$ and 20% TiC.

EXAMPLE 4

100 parts by weight of the prefused alumina-titania product were milled with 50 parts by weight of calcined alumina and 12.5 parts by weight of petroleum coke and then fused. The resulting product was crushed and the composition was found to be approximately 85% alpha alumina, 15% titanium carbide.

EXAMPLE 5

100 parts of the prefused alumina-titania material were milled with 10 parts by weight of rutile and 17.5 parts by weight of petroleum coke and fused. The resulting product had a composition of approximately 68% alpha alumina and 32% titanium carbide and was easily crushed to form granules.

EXAMPLE 6

A similar mixture comprising 100 parts by weight of the prefused alumina-titania product, 20 parts by weight of rutile and 22.5 parts by weight of petroleum coke, after milling, was fused to obtain a pig which crushed easily to form abrasive grain. The analysis of the product was approximately 52% $\alpha\ Al_2O_3$, 48% TiC.

The products obtained from Examples 3 to 6 were similar in appearance to the products obtained from Examples 1 and 2; and when polished sections of these products were examined microscopically the structure was found to be similar to that shown in the accompanying drawing. In a series of tests using a Wilson Tucon hardness tester with a 100 gram load the Vickers hardness of the titanium carbide phase of the products obtained from Examples 3 to 6 ranged from 2350 to 3700 while that of the alpha alumina phase ranged from 1400 to 1950.

The abrasive characteristics of novel $\alpha\ Al_2O_3$—TiC products according to the present invention were determined by using granules thereof as the grit for an abrasive coated product and also as the abrasive grain in a bonded grinding wheel.

Comparative tests were made between abrasive wheels formed from ordinary fused alumina abrasive and one formed from the novel abrasive of the present application. The wheels used were cutoff wheels 12 inches in diameter and ⅛ of an inch thick. The abrasive grain in each instance was similarly graded (minus 40 mesh plus 80 mesh), bonded with the same phenolic resin bond in an amount equivalent to 14% of the wheel volume, and cured in the same way. The following table shows the ratios of wheel loss to metal removed with different metals.

*Table I*

| Type of abrasive | Ratio by weight of wheel loss to metal loss | | |
|---|---|---|---|
| | Tool steel (400*) | Stainless steel #347(179*) | Brass (130*) |
| Fused alumina | 0.1:19.8 | 1:2 | 1:27 |
| $\alpha$-$Al_2O_3$-TiC | 1:24.6 | 1:2 | 1:13 |

*Brinell hardness.

The metals used in the above-mentioned tests were in the form of one inch round bars. A standard type of cutoff machine was used and the round metal workpiece was so mounted on each test that it was pressed against the wheel under a fixed load of 12 lbs., 6 oz. Five cuts ¾ in. deep were made with each wheel on each bar of metal tested. The efficiency ratio, i. e. the ratio of wheel loss to metal loss was calculated after each cut. The ratios given in Table I above are the averages for the five cuts. Although the wheel loss of the fused alumina wheel in the tests set forth above was somewhat less than with the $\alpha$ alumina-titanium carbide wheel, the latter greatly excelled the former in speed of cutting, both on the brass bar and on the bar of tool steel. A slot ¾ of an inch deep was cut in the tool steel bar in 1.25 minutes with the $\alpha\ Al_2O_3$—TiC wheel while 4.75 minutes was required to produce a slot the same size with the fused alumina wheel. In all cases the finish produced with the alpha alumina-titanium carbide wheel was good.

In other tests in which the novel abrasive of the present invention was compared with the standard abrasive silicon carbide and fused alumina in the form of coated abrasive products, the abrasive of the present invention was likewise found to be effective. The tests were made using abrasive discs 10 inches in diameter, each comprising a 6 oz. denim backing to which a different 60 grit abrasive was adhered by a glue adhesive. The discs were used for abrading blocks machined from castings of tool steel and magnesium. In carrying out each test, a metal block was mounted so that a face 1 inch square was held in contact with the abrasive face of one of the discs by a uniform load of about 8 pounds. Each test was for a period of 13 minutes during which the disc was rotated at 250 R. P. M. and the metal block being abraded was continuously oscillated radially of the disc from the periphery to the center thereof. In the following table the ratios of grain loss from the abrasive coated discs to the metal removed from the blocks are set forth.

*Table II*

| Type of abrasive | Ratio by weight of abrasive loss to metal loss | |
|---|---|---|
| | Tool steel | Magnesium |
| Silicon carbide | 1:0.64 | 1:0.21 |
| Fused alumina | 1:1.5 | (*) |
| $\alpha$-$Al_2O_3$-TiC | 1:5.0 | 1:8.0 |

*Not tested because of previous tests showing poor results.

The results in Table II show that superior abrasive action may be obtained from abrasive coated products made with abrasive grain of the type herein disclosed.

It will be understood that products of the type herein described may be produced in other types of furnaces. Thus, arc furnaces of other types may be used as well as induction furnaces. In experiments in induction heating using as a container a graphite crucible heated to temperatures between about 3360° F. and 3990° F. mixtures in finely divided form of the prefused alumina-titania product used in Example 2 with petroleum coke gave products quite similar to those made in the arc fusions described in the examples given above. The reaction was apparently quite complete and the products while rather porous had a structure as viewed in a microscope essentially like the products obtained from the arc furnace fusions.

As pointed out above, the raw materials for the novel abrasives of the present invention are to some extent a matter of choice. In this connection it will be realized that, if desired, compounds of titanium and aluminum, such as organic salts thereof which decompose to form the respective oxides below the melting points of the latter, may also be used. Furthermore, prefused mixtures of aluminous and titanous materials having compositions different from the mixture used in Example 2 may be used when convenient. While petroleum coke is preferred as a reducing agent, other reducing agents may be used. Thus, for example, carbon black or gas black or similar amorphous carbon products may be employed instead of petroleum coke. Maintenance of a reducing, carbonaceous atmosphere over the fusion product is necessary to prevent reoxidation of the titanium carbide in the product. This may usually be assured by the use of coke or other carbon reducing agent in an amount somewhat in excess of the stoichiometric amount required. However, reduction in contact of air with the hot product, such as may be obtained by shielding or enclosing the furnace, may in some cases be desirable.

As previously pointed out the novel products of the presente invention comprise fine crystals of titanium carbide dispersed in a matrix. The matrix consists essentially of crystalline alpha alumina. It appears that the presence in the latter of small amounts of impurities does not adversely affect its hardness to a significant extent. Consequently, as indicated above, the raw materials employed need not be extremely pure. Although the composition of the present novel products may vary from 99% $\alpha$-$Al_2O_3$—1% TiC to 99% TiC—1% $\alpha$-$Al_2O_3$, it will be appreciated that products having compositions near the ends of this range will differ only slightly from ordinary $\alpha$-$Al_2O_3$ and TiC, respectively.

In forming abrasive articles from the products of the present invention, any known or suitable bonds, backings, adhesives and the like may be employed. In forming such articles well known processes and apparatus may be used. The novel abrasive products of the present invention may be used in any desired grit size or combination thereof either alone or in admixture with other types of abrasives for obtaining abrasive products having desired properties.

I claim:

1. A hard electric furnace product which consists essentially of a matrix having dispersed therein fine crystals of titanium carbide in an amount from about 10% to 50% by weight, said matrix consisting essentially of crystalline alpha alumina.

2. A fused abrasive material which consists essentially of fine crystals of titanium carbide dispersed in a matrix, said matrix consisting essentially of crystalline alpha alumina, said carbide being present in an amount from about 10% to 50% by weight.

3. An abrasive material which consists essentially of fine crystals of titanium carbide dispersed in a matrix, said matrix consisting essentially of crystalline, fused, alpha alumina, said carbide being present in an amount from about 10% to 50% by weight.

4. A bonded abrasive product consisting essentially of granules of an abrasive material and a bond therefor, said abrasive material consisting essentially of fine crystals of titanium carbide dispersed in a matrix which consists essentially of crystalline alpha alumina, said carbide being present in an amount from about 10% to 50% by weight.

5. An abrasive coated product which consists essentially of a backing having granules of abrasive material secured thereto by an adhesive material, said abrasive material consisting essentially of fine crystals of titanium carbide dispersed in a matrix that consists essentially of crystalline alpha alumina, said carbide being present in an amount from about 10% to 50% by weight.

References Cited in the file of this patent

UNITED STATES PATENTS

| Number | Name | Date |
|---|---|---|
| 2,198,372 | Barnes | Apr. 23, 1940 |
| 2,285,837 | Ridgeway | June 9, 1942 |
| 2,360,841 | Baumann et al. | Oct. 24, 1944 |
| 2,378,399 | Fruth | June 19, 1945 |
| 2,418,496 | Baumann et al. | Apr. 8, 1947 |
| 2,424,645 | Baumann et al. | July 29, 1947 |
| 2,475,565 | Honchins | July 5, 1949 |
| 2,602,714 | Wheildon | July 8, 1952 |